(12) United States Patent
Visell et al.

(10) Patent No.: US 10,908,038 B2
(45) Date of Patent: Feb. 2, 2021

(54) STRETCHABLE, CONDUCTIVE INTERCONNECT AND/OR SENSOR AND METHOD OF MAKING THE SAME

(71) Applicant: THE REGENTS OF THE UNIVERSITY OF CALIFORNIA, Oakland, CA (US)

(72) Inventors: Yon Visell, Goleta, CA (US); Do Thanh Nho, Goleta, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/480,965

(22) PCT Filed: Jan. 31, 2018

(86) PCT No.: PCT/US2018/016214
§ 371 (c)(1),
(2) Date: Jul. 25, 2019

(87) PCT Pub. No.: WO2018/144589
PCT Pub. Date: Aug. 9, 2018

(65) Prior Publication Data
US 2020/0003638 A1 Jan. 2, 2020

Related U.S. Application Data

(60) Provisional application No. 62/452,758, filed on Jan. 31, 2017.

(51) Int. Cl.
*G01L 1/00* (2006.01)
*G01L 1/20* (2006.01)
(Continued)

(52) U.S. Cl.
CPC ............. *G01L 1/205* (2013.01); *H01B 1/02* (2013.01); *H01B 1/12* (2013.01); *H01B 7/04* (2013.01)

(58) Field of Classification Search
CPC .. G01L 1/205; H01B 1/02; H01B 1/12; H01B 7/04
(Continued)

(56) References Cited

U.S. PATENT DOCUMENTS 4,510,939 A * 4/1985 Brenman ............. A61N 1/0452
600/384
4,879,698 A * 11/1989 Langberg ............ H01L 41/0986
367/140

(Continued)

FOREIGN PATENT DOCUMENTS

| CN | 205508050 | 8/2016 |
|---|---|---|
| JP | 2003050165 A | 2/2003 |
| WO | 2014204323 A1 | 12/2014 |

OTHER PUBLICATIONS

International Search Report and the Written Opinion of the International Searching Authority for PCT/US2018/016214, dated May 8, 2018.

*Primary Examiner* — Max H Noori
(74) *Attorney, Agent, or Firm* — Michael A. Collins; Billion & Armitage

(57) ABSTRACT

A stretchable, conductive tubule is capable of operating as an electrical interconnect and/or a sensor. The stretchable, conductive tubule has a first end and a second end, and includes a stretchable conductor housed within the stretchable tubule. A first electrode is electrically coupled to the stretchable conductor at the first end of the stretchable tubule, and a second electrode is electrically coupled to the stretchable conductor at the second end of the stretchable tubule.

19 Claims, 17 Drawing Sheets

(51) Int. Cl.
*H01B 1/02* (2006.01)
*H01B 1/12* (2006.01)
*H01B 7/04* (2006.01)

(58) Field of Classification Search
USPC .................................................. 73/862.629
See application file for complete search history.

(56) References Cited

U.S. PATENT DOCUMENTS

| | | | | |
|---|---|---|---|---|
| 8,191,427 | B2 * | 6/2012 | Hattori | E05F 15/44 |
| | | | | 324/601 |
| 8,958,890 | B2 * | 2/2015 | Kipke | A61N 1/05 |
| | | | | 607/118 |
| 10,331,216 | B1 * | 6/2019 | Khoshkava | G06F 3/0338 |
| 10,591,367 | B2 * | 3/2020 | Jarvinen | G01D 5/2417 |
| 2011/0134655 | A1 * | 6/2011 | Ohtani | F21S 41/28 |
| | | | | 362/546 |
| 2011/0185819 | A1 | 8/2011 | Hattori et al. | |
| 2011/0278040 | A1 * | 11/2011 | Zhang | B29C 70/086 |
| | | | | 174/69 |
| 2012/0259239 | A1 * | 10/2012 | Chenaux | A61B 5/411 |
| | | | | 600/554 |
| 2016/0290880 | A1 | 10/2016 | Lewis et al. | |
| 2019/0133479 | A1 * | 5/2019 | Chang | A61B 5/04023 |
| 2020/0136101 | A1 * | 4/2020 | Ardebili | H01M 4/131 |

* cited by examiner

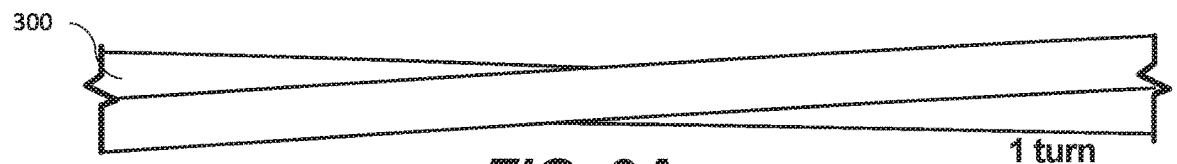
FIG. 3A    1 turn
FIG. 3B    3 turns
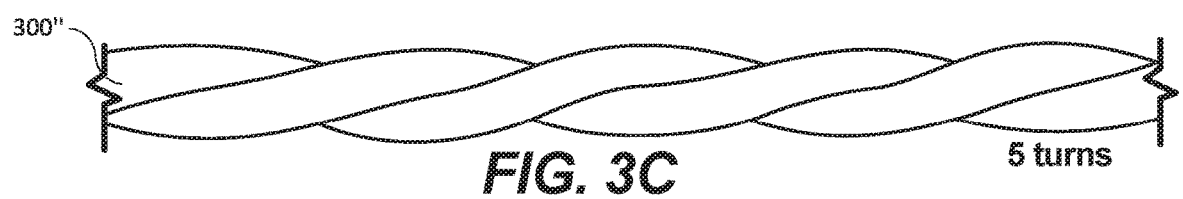
FIG. 3C    5 turns
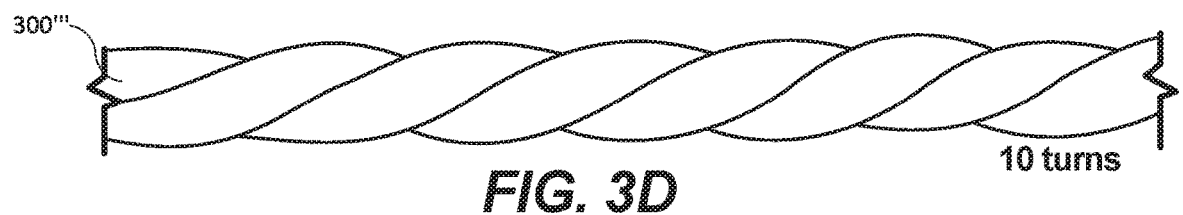
FIG. 3D    10 turns
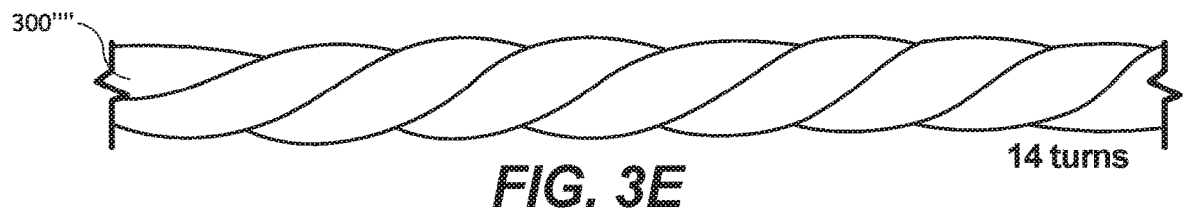
FIG. 3E    14 turns

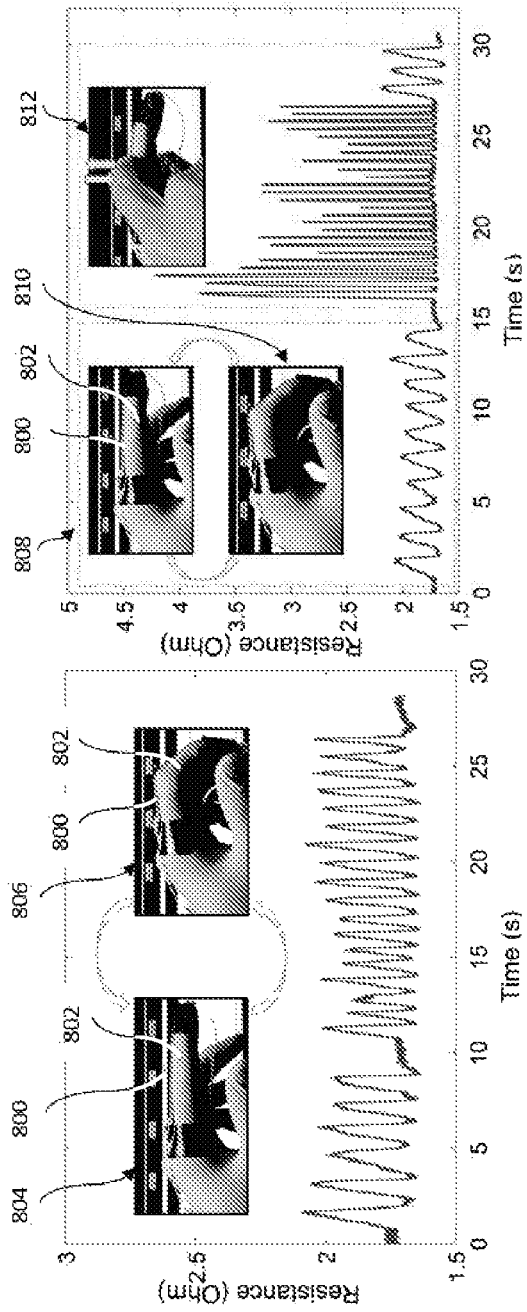
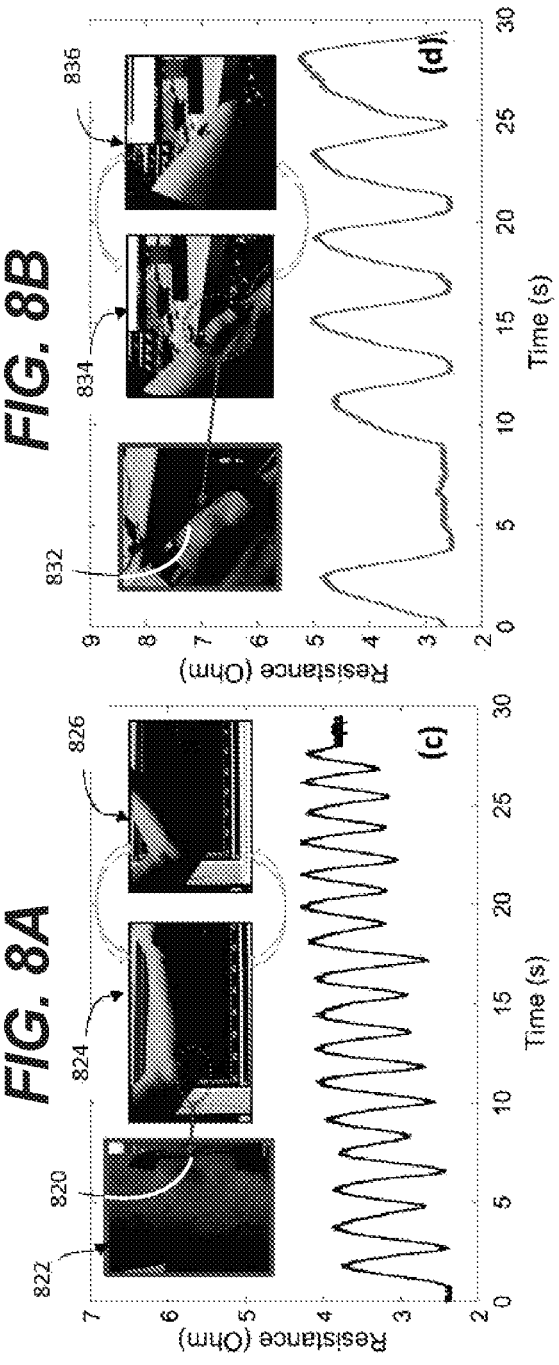
FIG. 8A
FIG. 8B
FIG. 8C
FIG. 8D

STRETCHABLE, CONDUCTIVE INTERCONNECT AND/OR SENSOR AND METHOD OF MAKING THE SAME

CROSS-REFERENCE TO RELATED APPLICATIONS

This application claims priority to U.S. Provisional Application No. 62/452,758, filed on Jan. 31, 2017, and entitled "STRETCHABLE, CONDUCTIVE INTERCONNECT AND/OR SENSOR AND METHOD OF MAKING THE SAME," the disclosure of which is incorporated by reference in its entirety.

STATEMENT OF GOVERNMENT RIGHTS

This invention was made with Government support under Grant (or Contract) No. 1623459 and 1628831, awarded by the National Science Foundation. The Government has certain rights in this invention.

TECHNICAL FIELD

This invention relates generally to sensors and interconnects, and in particular to stretchable sensors and interconnects.

BACKGROUND

An electrical interconnect refers to an electrical connection made between two points. For example, a copper wire is an example of commonly used electrical interconnect. A typical electrical interconnect—such as a copper wire—is not stretchable, and is therefore ill-suited for applications that require flexibility and/or stretchability, such as electronics adhered to people (e.g., medical applications), robotic applications, and others. In addition, sensing movement/forces applied to an electronic device is also difficult. In particular, while electronics are commonly utilized to detect binary conditions (such as contact, or no contact), it is more difficult to design sensors capable of measuring force applied to a sensor, or amount of movement/stretching experienced by a sensor.

It would therefore be beneficial to develop a stretchable, conductive interconnect. In addition, it would also be beneficial to develop a stretchable sensor capable of detecting force applied to the sensor, including one or more of strain, rotation, and/or contact.

SUMMARY

According to one embodiment, a stretchable, conductive tubule is capable of operating as an electrical interconnect and/or a sensor. The stretchable, conductive tubule is comprised of a first end and a second end, and includes a stretchable conductor housed within the stretchable tubule. A first electrode is electrically coupled to the stretchable conductor at the first end of the stretchable tubule, and a second electrode is electrically coupled to the stretchable conductor at the second end of the stretchable tubule. Sensitivity of the stretchable, conductive tubule is increased by twisting the tubule a number of times.

According to another embodiment, a method of manufacturing a stretchable, conductive interconnect is described. The method includes depositing a liquid layer onto a surface and rolling a rod across the surface to coat the rod with the liquid layer. The rod is heated to cure the liquid layer coating the rod to form a stretchable tube. The stretchable tubule is removed from the rod, and a stretchable conductor is inserted into the stretchable tube. The first and second ends of the stretchable tube are capped, and first and second electrodes are placed in contact with the stretchable conductor, to form a stretchable, conductive interconnect.

According to another embodiment, a sensor is comprised of a stretchable tube that houses a stretchable conductor. A first electrode is electrically coupled to the stretchable conductor at a first end of the stretchable tubule. A second electrode is electrically coupled to the stretchable conductor at the second end of the stretchable tubule, wherein the stretchable tubule is twisted a number of times to form a twisted, stretchable, conductive tubule.

BRIEF DESCRIPTION OF THE DRAWINGS

FIG. 3 are side views of a twisted, stretchable, conductive tubule that illustrate various numbers of turns, according to embodiments of the present invention.

FIG. 8a is a graph that illustrates the resistance measured in a twisted, stretchable, conductive tubule finger sensor in response to the finger bending and extending over a number of cycles, FIG. 8b is a graph that illustrates the resistance measured in a twisted, stretchable, conductive tubule finger sensor in response to applying force to the sensor over a number of cycles; FIG. 8c is a graph that illustrates the resistance measured in a twisted, stretchable, conductive tubule elbow sensor in response to cycles of elbow extension; and FIG. 8d is a graph that illustrates the resistance measured in a twisted, stretchable, conductive tubule knee sensor in response to cycles of knee extension, according to embodiments of the present invention.

DETAILED DESCRIPTION

The present disclosure describes a stretchable, conductive tubule and method of manufacturing the same. The stretchable, conductive tubule is conductive, and may be used as an electrical interconnect in applications that require stretchable/flexible interconnects. In addition, the stretchable, conductive tubule exhibits changes in resistance in response to the application of various physical forces, including linear strain, rotation, and contact. Measured changes in resistance can be utilized to ascertain the amount or magnitude of the strain/rotation/contact experience by the stretchable, conductive tubule. Twisting the stretchable, conductive tubule increases the sensitivity of the tubule to applied forces. For example, as the number of turns of the stretchable, conductive tubule increases, the measured resistance changes more dramatically (i.e., more sensitive) to applied strain.

In one embodiment, the stretchable, conductive tubule is comprised of an elastomer tube and a stretchable conductor housed within the tube, and electrodes positioned on each end and in electrical contact with the stretchable conductor. In one embodiment, the stretchable, conductive tubule is folded over on itself, and twisted to form a twisted, stretchable, conductive tubule. In other embodiments, a pair of stretchable, conductive tubules are aligned and twisted together, wherein a first end of one of the conductive tubules is connected to a first end of the other conductive tubule to provide a continuous conductive path between the conductive tubules. Twisting the stretchable, conductive tubule or pairs of tubules increases the resistive sensitivity of the tubule to applied forces such as strain, rotation, and/or contact. This is because the resistance measured through the stretchable, conductive tubule is a function—at least in part—of the cross-sectional area of the stretchable conductor housed by the stretchable tube. Linear strain or stretching of the stretchable, conductive tubule decreases the cross-sectional area and increases the length, resulting in an increase in measured resistance. Similarly, rotating or twisting the stretchable, conductive tubule results in a decrease/deformation of the cross-sectional area that results in an increase in measured resistance. A contact or pressing force similarly decreases/deforms the cross-sectional area and causes the measured resistance to increase. Twisting the stretchable, conductive tubules increases the resistive sensitivity of the tubules to these various forces. In this way, the measured resistance of the stretchable, conductive tubule can be utilized to detect various physical forces, such as linear strain, rotation, and contact.

Figure 1:
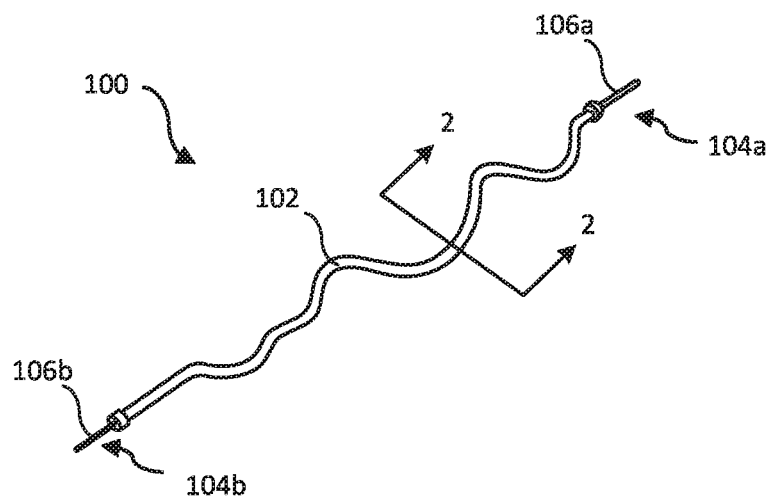
FIG. 1 is a perspective view of a stretchable, conductive tubule, according to an embodiment of the present invention.
Figure 2:
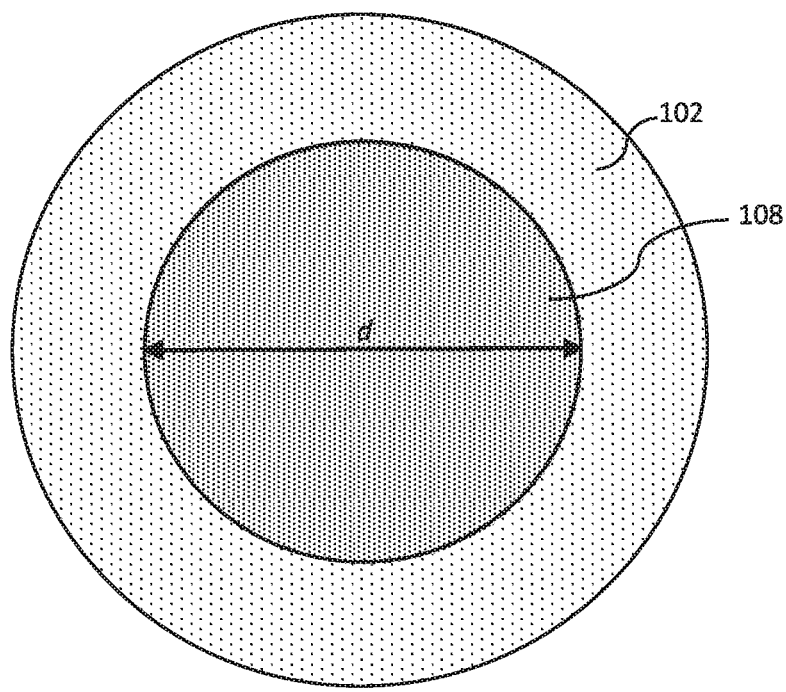
FIG. 2 is a cross-sectional view of the stretchable, conductive tubule shown in FIG. 1, taken along line 2-2, according to an embodiment of the present invention.

Referring now to FIGS. 1 and 2, a stretchable, conductive tubule 100 is illustrated. In particular, FIG. 1 is a perspective view of stretchable, conductive tubule 100, according to an embodiment of the present invention. Stretchable, conductive tubule 100 includes stretchable tube 102 having a first end 104a and a second end 104b, and electrical contacts 106a and 106b located at each end of stretchable tube 102. FIG. 2 is a cross-sectional view taken along line 2-2 shown in FIG. 1 which illustrates the presence of stretchable conductor 108 located within stretchable tube 102.

In one embodiment, stretchable tube 102 is a hollow, silicone tubule, comprised of an elastomeric material, such as liquid Ecoflex® 00-30, or the elastomeric polysiloxane nanocomposite Gelest® ExSil™ 100. The amount of stretch associated with stretchable tube 102 is based on the material utilized and the geometry (wall width, etc.), and may be selected based on the particulars of the application. In one embodiment, stretchable tube 102 is designed to stretch by at least fifty percent (50%), while in other embodiments may be capable of stretching as much as 100%, 200%, 400%, and/or 600% or more. The inner diameter d of stretchable tube 102 may be selected based on the particular application. Although a variety of possible diameters may be selected, in one embodiment the diameter d is between one micrometer (1 μm) and forty (40) μm. In embodiments in which the diameter d is in the micrometer scale, the stretchable, conductive tubule may be referred to as a microtubule. The stretchable conductor 108 located within the hollow interior of stretchable tube 102 may be any stretchable conductor, but in one embodiment is a liquid metal alloy such as eutectic gallium indium (eGaIn). In other embodiments, the stretchable conductor 108 may be comprised of other materials, such as a doped elastomer, conductive gel, or combinations thereof. The combination of stretchable tube 102 and stretchable conductor 108 allows stretchable, conductive tubule 100 to operate as a stretchable, electrical interconnect between two points. In other embodiments, stretchable, conductive tubule 100 is folded over on itself, bringing ends 104a and 104b in proximity with one another, and twisting the tubule 100 a number of times to create a tested, stretchable, conductive tubule. An ohmmeter (not shown) connected to conductors 106a and 106b measures the resistance presented by the tubule and the stretchable conductor contained therein. Strain, rotation and/or contact force applied to the twisted, stretchable, conductive tubule results in a change in measured resistance. Twisting the stretchable, conductive, tubule improves the resistive sensitivity of the tubule to such forces, as discussed in more detail below. In other embodiments, instead of folding the stretchable, conductive tubule 100 over on itself to bring end 104a and 104b into proximity with one another, a pair of stretchable, conductive tubules are utilized. In this embodiment, a first end (i.e., conductor) of one of the stretchable, conductive tubules is connected to a first end (i.e., conductor) of the other stretchable, conductive tubule. The pair of tubules are then twisted together, and the ohmmeter (not shown) is connected to the second end of one of the tubules and the second end of the other tubule. In this way, a continuous conductive path is formed between the pair of stretchable, conductive tubules, wherein the resistance measured through the pair of tubules is related to the number of times the pair of tubules are twisted together, and the external force applied to the twisted pair.

Referring now to FIGS. 3a-3e, stretchable, conductive tubule 100 is illustrated having various number of turns. These embodiments may utilize a configuration in which the stretchable, conductive tubule 300' is folded over on itself such that a first end and a second end (not shown) are near to one another and then twisted a number of times to form the various twisted pair geometries shown in FIGS. 3a-3e, or an embodiment in which a pair of stretchable, conductive tubules are connected together at one end and twisted together. In the embodiment shown in FIG. 3a, microtubule sensor 300 utilizes a single turn. In the embodiment shown in FIG. 3b, microtubule sensor 300' utilizes three turns. In the embodiment shown in FIG. 3c, microtubule sensor 300" utilizes five turns. In the embodiment shown in FIG. 3d, microtubule sensor 300''' utilizes ten turns, and FIG. 3e illustrates an embodiment in which microtubule sensor 300'''' utilizes fourteen turns. As discussed in more detail below, the number of turns employed affects how the resistance of the stretchable, conductive tubule responds to various forces, including linear strain, contact forces (e.g., pressing) and rotation. In general, increasing the number of turns associated with the twisted, stretchable, conductive tubule sensor 300 increases the resistive sensitivity of the tubule to applied/external forces. That is, more turns of the twisted, stretchable, conductive tubules results in the resistance changing more dramatically in response to an applied force.

In particular, the resistance (R) of stretchable, conductive tubule 300 depends on a number of factors, including the resistivity of stretchable conductor 108 (denoted ρ), cross-sectional area of the stretchable conductor (denoted S), and length of stretchable conductor (denoted L). The resistance can be described by the following equation:

$$R = \frac{\rho * L}{S} \quad (1)$$

This equation illustrates how the application of force to the stretchable, conductive tubule results in a change in measured resistance. For example, the application of a linear force causes the length of the tubule L to stretch/increase and the corresponding surface area S to decrease, which increases resistance R. Similarly, a pressure force that compresses one portion of the tubule, or rotational forces that cause the number of turns of the sensor to increase/decrease, results in a decrease in the cross-sectional area S, which again causes an increase in the measured resistance R. Twisting the stretchable, conductive tubule further increases the response (e.g., sensitivity) of the stretchable, conductive tubule to applied forces.

Figure 4B:
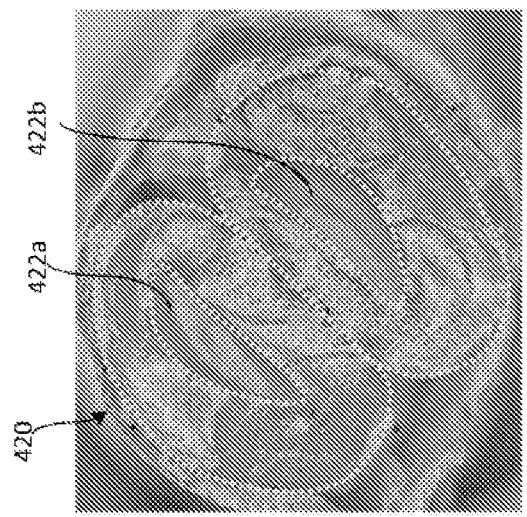
FIG. 4b is a cross-sectional view of a twisted, stretchable, conductive tubule that illustrates deformation of the cross-sectional area of the stretchable conductor.
Figure 4D:
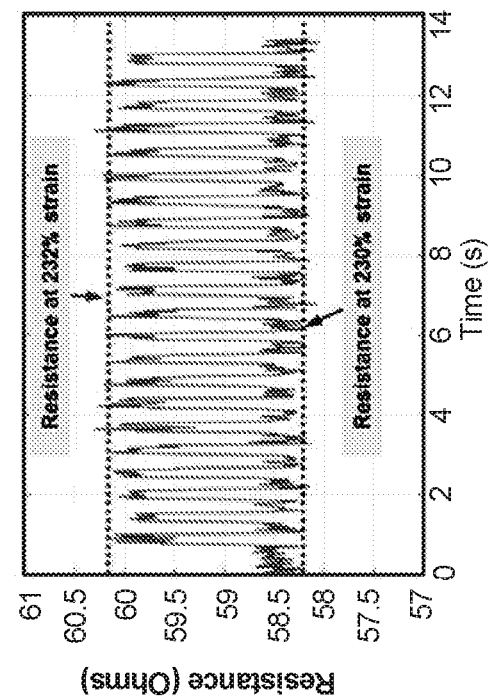
FIG. 4d is a graph that illustrates resistance measured at different strain levels, according to embodiments of the present invention.
Figure 4A:
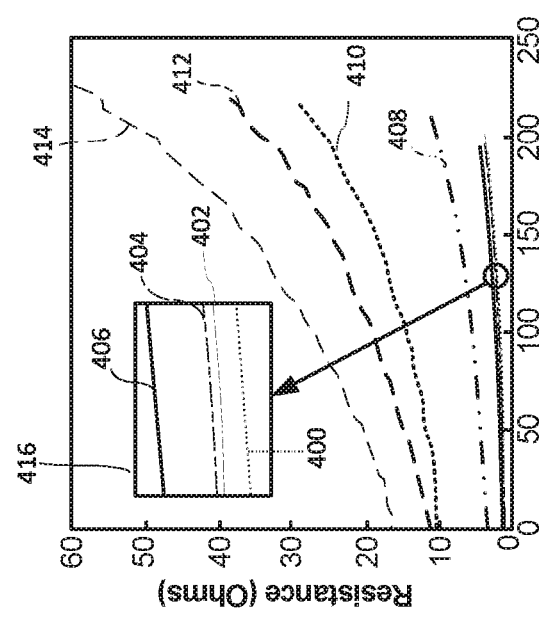
FIG. 4a is a chart illustrating a relationships between strain and resistance for stretchable, conductive tubules utilizing various numbers of turns, according to embodiments of the present invention.
Figure 4C:
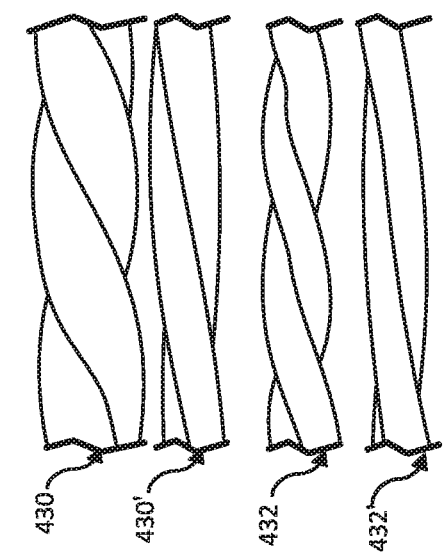
FIG. 4c are side views that illustrate a fourteen turn stretchable, conductive tubule in a non-stretched state and a stretched state, and a seven turn stretchable, conductive tubule in a non-stretched state and a stretched state, respectively.

FIG. 4a is a graph illustrating a relationships between a strain force and resistance for stretchable, conductive tubules utilizing various numbers of turns, according to embodiments of the present invention; FIG. 4b is a cross-sectional view of a twisted, stretchable conductive tubule that illustrates deformation of the cross-sectional area S of the stretchable conductor; FIG. 4c are side views that illustrate a fourteen turn stretchable, conductive tubule in a non-stretched state and a stretched state, and a seven turn stretchable, conductive tubule in a non-stretched state and a stretched state, respectively; and FIG. 4d is a graph that illustrates resistance measured at different strain levels, according to embodiments of the present invention.

With respect to FIG. 4a, the strain applied to a stretchable, conductive tubule (for example, stretchable, conductive tubule 100 shown in FIG. 1) is illustrated along the x-axis, while the measured resistance measured in Ohms is illustrated along the y-axis. In this example, strain is applied in a linear direction along the axis of stretchable, conductive tubule, resulting in stretching of stretchable, conductive tubule. Strain is indicated as a percentage of the length of stretchable, conductive tubule. For example, a strain of 50% indicates that the length of the tubule has been increased by 50% as a result of the strain applied to the sensor (e.g., a sensor having a length of two inches when unstretched, would have a length of three inches when strained by 50%). Likewise, a strain of 100% indicates that the stretchable, conductive tubule has been strained to twice the original length of the stretchable, conductive tubule, and a strain of 200% indicates that the sensor has been strained to three times the original length of the stretchable, conductive tubule. In the embodiment shown in FIG. 4a, stretchable, conductive tubules utilizing a plurality of different numbers of turns n are illustrated, including two turns (line 400), four turns (line 402), seven turns (404), ten turns (406), fourteen turns (408), sixteen turns (410), seventeen turns (412), and eighteen turns (414). The difference between microtubule sensors having two turns, four turns, seven turns, and ten turns are difficult to discern from one another. A magnified view is illustrated in insert 416 with respect to a strain of approximately 130%, illustrating the differences between each of the plurality number of turns.

In general, the results illustrated in FIG. 4a show how resistance increases with increased strain. However, the resistive sensitivity of the stretchable, conductive tubule to strain is dependent on the number of turns n, with sensitivity increasing with the number of turns. For example, as the number of turns n increases greater than ten (e.g., sixteen turns, seventeen turns, and eighteen turns), the stretchable, conductive tubule becomes more sensitive to strain. The increased sensitivity to strain at higher numbers of turns n is a result of the compression interaction between the twisted tubules, which results in increased deformation of the channels housing the stretchable conductor. That is, the combination of more turns n and increased strain results in deformation of the channel, reducing the cross-sectional area of the channel housing the stretchable conductor as well as increasing the length of the microtubule sensor. The result is an increase in resistance in response to increased strain. One of the benefits of utilizing twisted, stretchable, conductive tubules is that the number of turns can be utilized to tune and/or configure the resistive response of the twisted, stretchable, conductive tubules in response to applied force, based on the application. In some applications, very little strain/force may be applied to the tubule, and high sensitivity is required to detect the applied strain. In other embodiments, more significant strain may be applied and less sensitivity may be required.

FIG. 4b is a cross-sectional view of a twisted, stretchable, conductive tubule 420 utilized in a sensor configuration that illustrates the deformation of the respective channels 422a and 422b that houses the stretchable conductor (e.g., stretchable conductor 108 shown in FIG. 1). Although labeled as channels 422a and 422b, it should be understood that in one embodiment channels 422a and 422b are part of the same stretchable, conductive tubule folded over on itself and twisted. In the embodiment shown in FIG. 4b, the channel is not circular, but is deformed substantially as a result of compression forces caused by a combination of the number of turns and strain applied to the twisted, stretchable, conductive tubule 420. FIG. 4c is a side view that illustrates a stretchable, conductive tubule 430 having fourteen turns (both in a non-stretched state 430 and a stretched state 430'), and a stretchable, conductive tubule 432 having seven turns (again, both in a non-stretched state 432 and a stretched state 432'). The stretched state illustrated represents a strain of 100% (microtubule stretched to twice the original length).

FIG. 4d is a graph that illustrates the resistance (y-axis) measured in Ohms over a period of time (x-axis) measured in seconds (s) in response to application of a cyclical strain to the stretchable, conductive tubule having eighteen turns. In the embodiment shown in FIG. 4d, the stretchable, conductive tubule is stretched under an initial strain of 230%, and cyclically strained/loaded to 232% over the indicated period of time (s). That is, resistance is measured while the stretchable, conductive tubule is cyclically strained between a minimum of 230% strain and a maximum of 232% strain, with corresponding changes in resistance measured. One of the benefits of the stretchable, conductive tubule is the stability in resistances measured over a period of time, even when the strain measured is relatively small (e.g., 2%).

Figure 5A:
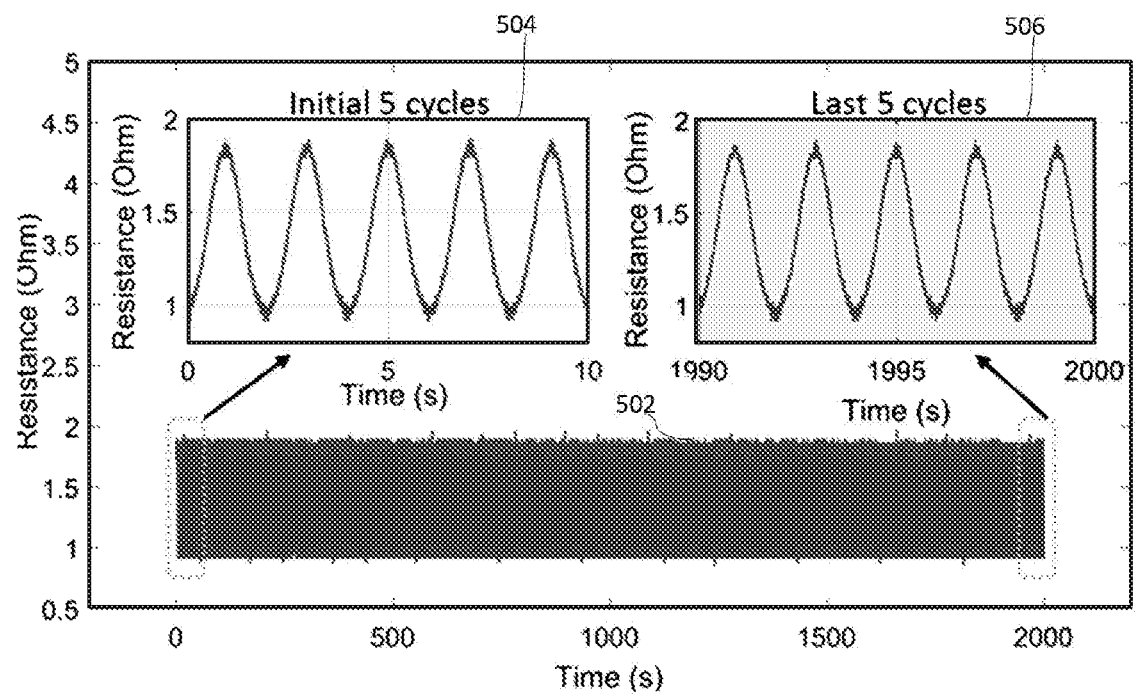
FIGS. 5a and 5b illustrates measured resistance during repeated loading/straining of a twisted, stretchable, conductive tubule having four turns and ten turns, respectively, according to embodiments of the present invention.
Figure 5B:
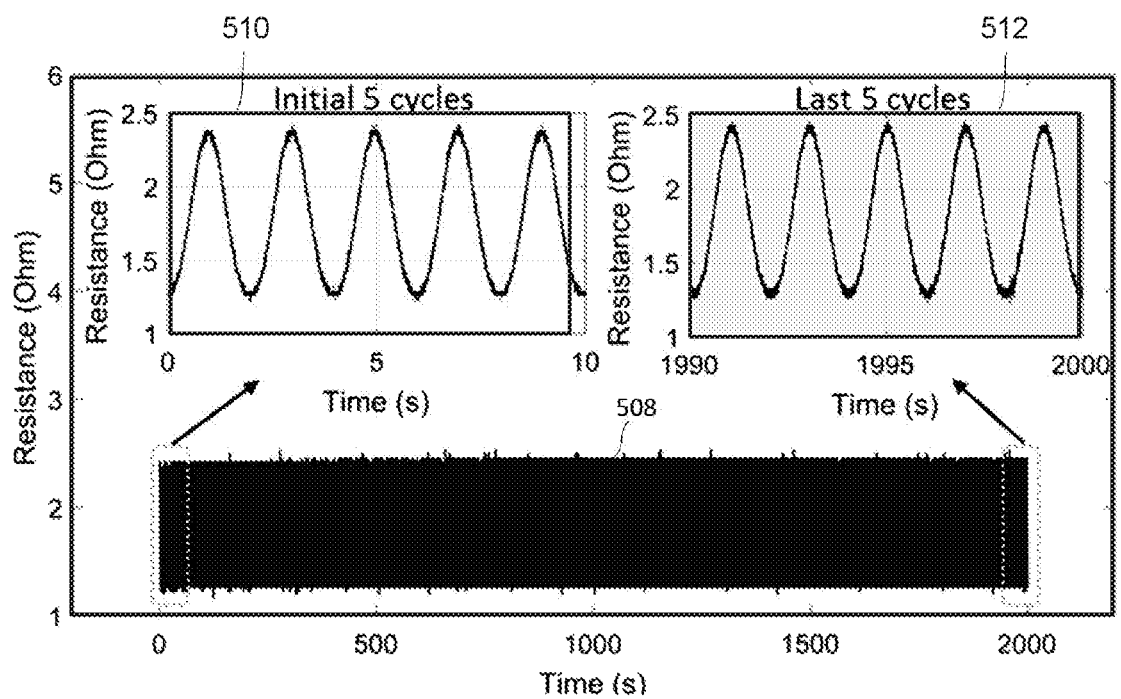

FIGS. 5a and 5b further illustrate the stability of changes in resistance measured over time and in response to repeated loading/straining of a twisted, conductive, tubule having four turns and ten turns, respectively, according to embodiments of the present invention.

In particular, the embodiment shown in FIG. 5a illustrates repeated loading/straining of a stretchable, conductive tubule characterized by four turns, with the linear strain applied cyclically to the tubule. In this embodiment, linear strain is varies between 0% strain and 100% strain. The cycling continues for approximately two-thousand seconds and is illustrated in graph 502. The first five cycles (approximately 10 seconds) and last five cycles (approximately 10 seconds) are magnified and shown in the graph inserts 504 and 506, which illustrate the measurement stability of the stretchable, conductive tubule. In the embodiment shown in FIG. 5a, the measured resistance varies between approximately 1 Ohm ($\Omega$) and 1.8$\Omega$, for a range of approximately 0.8$\Omega$. As indicated by the measurements taken in response to the initial five cycle and last five cycles, the measurements remain extremely stable over the total duration of the cycling. A benefit of this finding is that the twisted, stretchable, conductive tubules may be tuned to a particular application, and are able to retain a stable response to applied load over a number of cycles.

FIG. 5b illustrates repeated loading/straining of a stretchable, conductive tubule characterized by ten turns, with the linear strain applied cyclically to the tubule. Once again, linear strain applied cycles between 0% strain and 100% strain for approximately two-thousand seconds as illustrated in graph 508. The initial five cycles and last five cycles are magnified and shown in inserts 510 and 512, respectively. In this embodiment, due to the increased number of turns (from four turns to ten turns), the sensitivity of the stretchable, conductive tubule is increased over that shown in FIG. 5a, and ranges between approximately 1.3$\Omega$ and 2.4$\Omega$, for a range of approximately 1.1$\Omega$. Once again, the first five cycles and the last five cycles indicate stability in the measurements over the total duration of the cycling.

Figure 6:
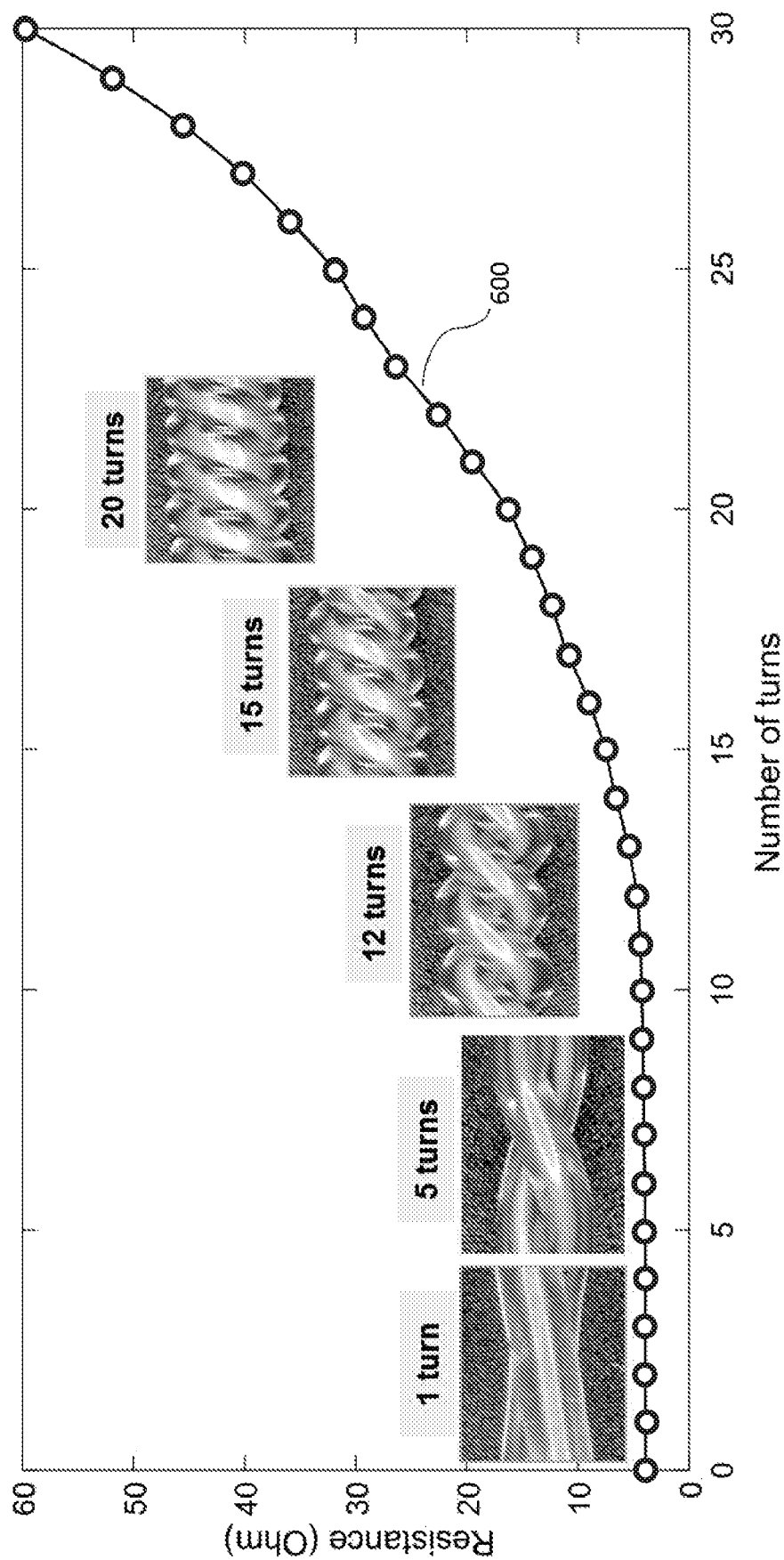
FIG. 6 is a graph that illustrates how resistance increases with increased numbers of turns according to an embodiment of the present invention.

Referring now to FIG. 6, in addition to measuring changes in resistance resulting from linear strain, the stretchable, conductive tubule may also be utilized to monitor changes in the number of turns of the tubule, which may be utilized to measure rotation. FIG. 6 is a graph that illustrates how the measured resistance (shown in the y-axis) increases as the number of turns (shown on the y-axis) increases, as indicated by line 600. This embodiment relies on a stretchable, conductive tubule pair having a length of approximately 40 mm in an unstrained state.

FIG. 6 indicates, as expected, that as the number of turns increases the measured resistance increases as well. The resistance remains relatively constant (approximately 4-5$\Omega$) between one turn and ten turns. Additional turns result in corresponding increases to measured resistance. At eighteen turns, the resistance is approximately 100. At twenty-one turns the resistance increases to 200. At twenty-four turns the measured resistance is equal to approximately 300, and at thirty turns, the resistance is equal to approximately 60$\Omega$. In this way, the stretchable, conductive tubule may also be used to provide feedback regarding rotation/turning of the stretchable, conductive tubule.

Figure 7A:
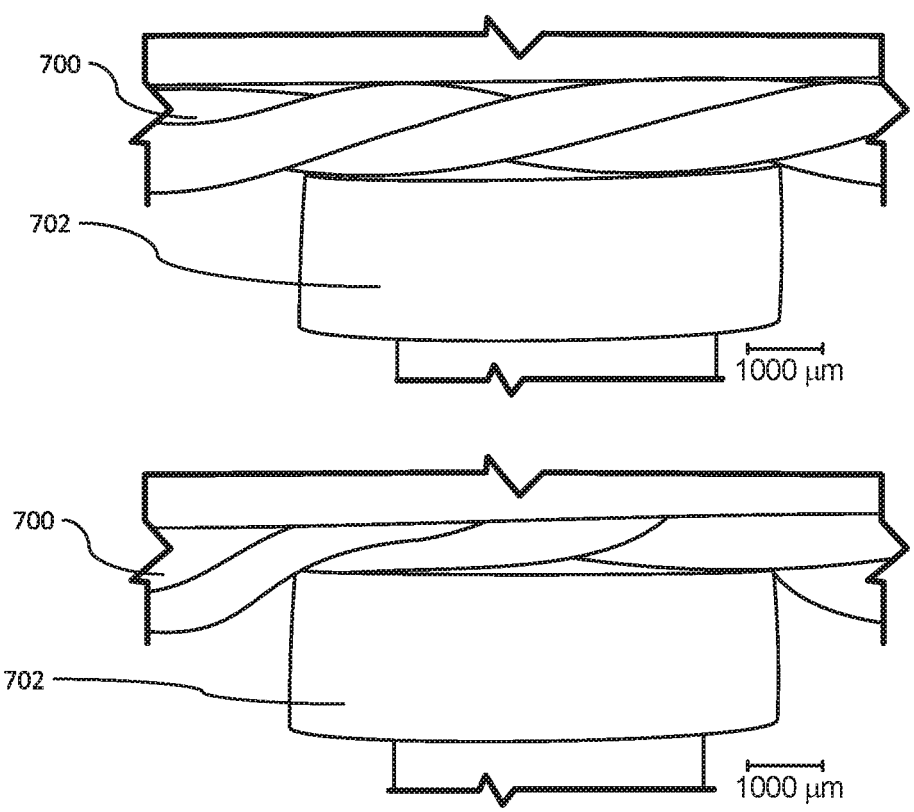
FIG. 7a is a side view that illustrates a contact force applied to a twisted, stretchable, conductive tubule, with the top portion illustrating the tubule without the application of force and the bottom portion illustrating the tubule with the application of force.

Referring now to FIGS. 7a-7d, in addition to measuring changes in resistance resulting from linear strain, and changes in resistance resulting from rotation, a change in resistance is also detectable in response to a contact force (e.g., pressing) on the stretchable, conductive tubule. The embodiment shown in FIG. 7a illustrates this type of contact force, wherein a twisted, stretchable, conductive tubule 700 is compressed by a contact force applied by press 702. In the top portion of FIG. 7a, the stretchable, conductive tubule 700 is uncompressed (or compressed very slightly), while in the lower portion of the FIG. 7a the stretchable, conductive tubule 700 is shown in a compressed state due to force applied by press 702. The compression of stretchable, conductive tubule 700 at this point results in deformation of the channel holding the stretchable conductor, wherein the resulting change in cross-sectional area S results in a detectable change in measured resistance.

Figure 7C:
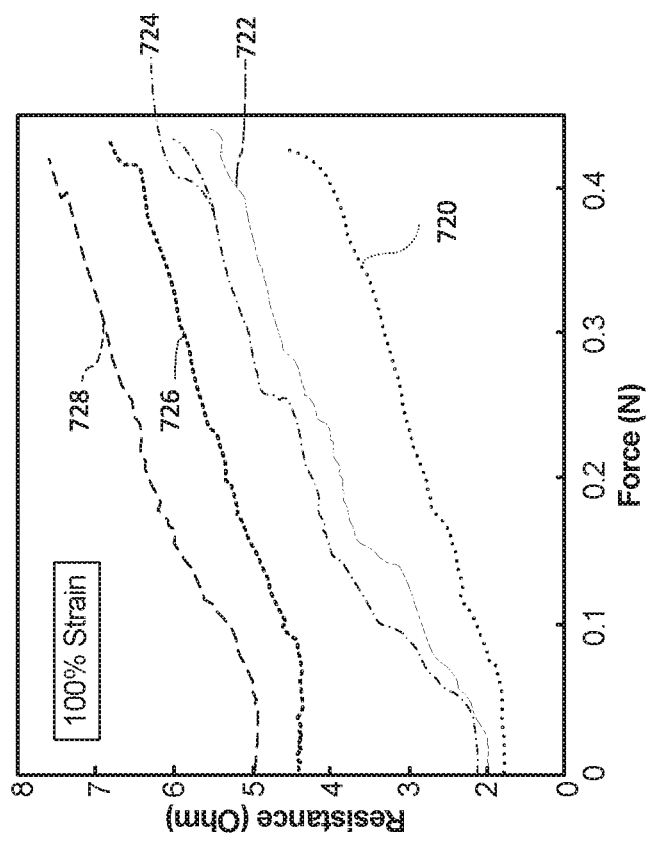
FIGS. 7b and 7c are graphs that illustrate the measured change in resistance detected in response to contact pressure for a plurality of numbers of turns of a stretchable, conductive tubule.
Figure 7B:
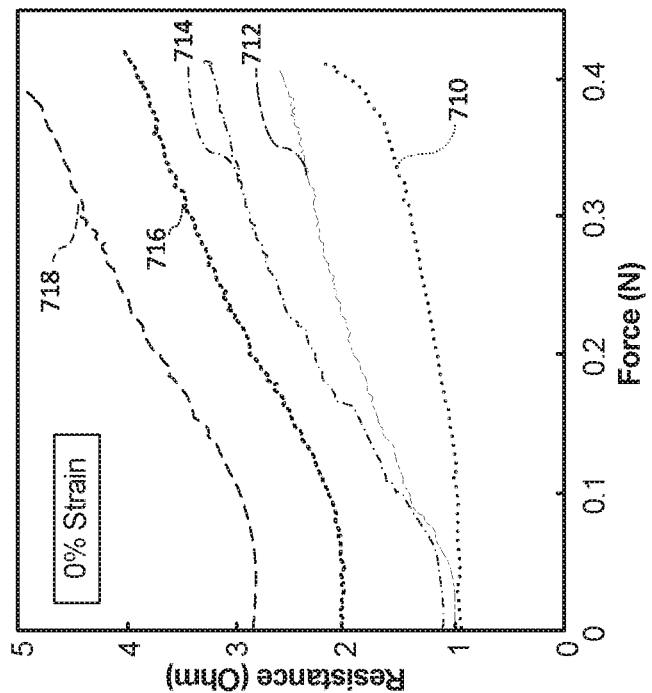

FIGS. 7b and 7c are graphs that illustrate the measured change in resistance detected in response to contact pressure for a plurality of numbers of turns of the stretchable, conductive tubule 700. FIG. 7b illustrates the measured change in resistance without the presence of strain on the stretchable, conductive tubule 700, and FIG. 7c illustrates the measured change in resistance with the presence of strain (e.g., 100% strain) on the stretchable, conductive tubule 700.

In particular, FIG. 7b illustrates a change in resistance as the contact force is increased from zero Newtons (N) to 0.4 N, and for a plurality of different numbers of turns, including zero turns (line 710), two turns (line 712), six turns (line 714), eleven turns (line 716), and twelve turns (line 718). As shown in FIG. 7b, an increase in force applied to the stretchable, conductive tubule results in an increase in resistance. However, the stretchable, conductive tubules with fewer twisted turns illustrate less change in measured resistance (i.e., smaller slope). In the embodiment shown in FIG. 7b, increasing the number of turns of the twisted conductive microtubule sensors increases the sensitivity of the sensor (e.g., steeper slope correlating with higher sensitivity).

In addition, the embodiment shown in FIG. 7b indicates that the measured resistance remains unchanged until a threshold level of contact force is exceeded (e.g., 0.08 N). In one embodiment, this threshold is a result of any initial elastic deformation of the twisted conductive microtubule being applied to the elastomer tube, rather than the interior channel of the elastomer tube. After the threshold level of force has been exceeded, subsequent force applied to the stretchable, conductive tubule results in deformation of the channel, resulting in an in an increase in the measured resistance. As the number of turns increases, the initial level of force required to deform the channel is decreased as the channels are deformed more readily in response to a lower level threshold of force. In this way, increasing the number of turns of the stretchable, conductive tubule 700 increases the resistive sensitivity and decreases the threshold level of force required to detect a contact force.

FIG. 7c similarly illustrates the resistance measured in response to a contact force increased from 0 N to 0.4 N for a plurality of different number of turns, including zero turns (line 720), two turns (line 722), six turns (line 724), eleven turns (line 726), and twelve turns (line 728). In contrast with the embodiment shown in FIG. 7b, the stretchable, conductive tubule in FIG. 7c is tested under 100% strain. As compared with the results shown in FIG. 7b, the measured resistance is generally higher when the stretchable, conductive tubule is under strain. However, FIG. 7c illustrates that despite the amount of strain initially applied to the stretchable, conductive tubule, the resistance increases in response to an applied contact force. Once again, the stretchable, conductive tubules with more twisted turns illustrate more change in measured resistance in response to a change in force (i.e., greater slope), illustrating greater resistive sensitivity for higher turn tubules.

Figure 7D:
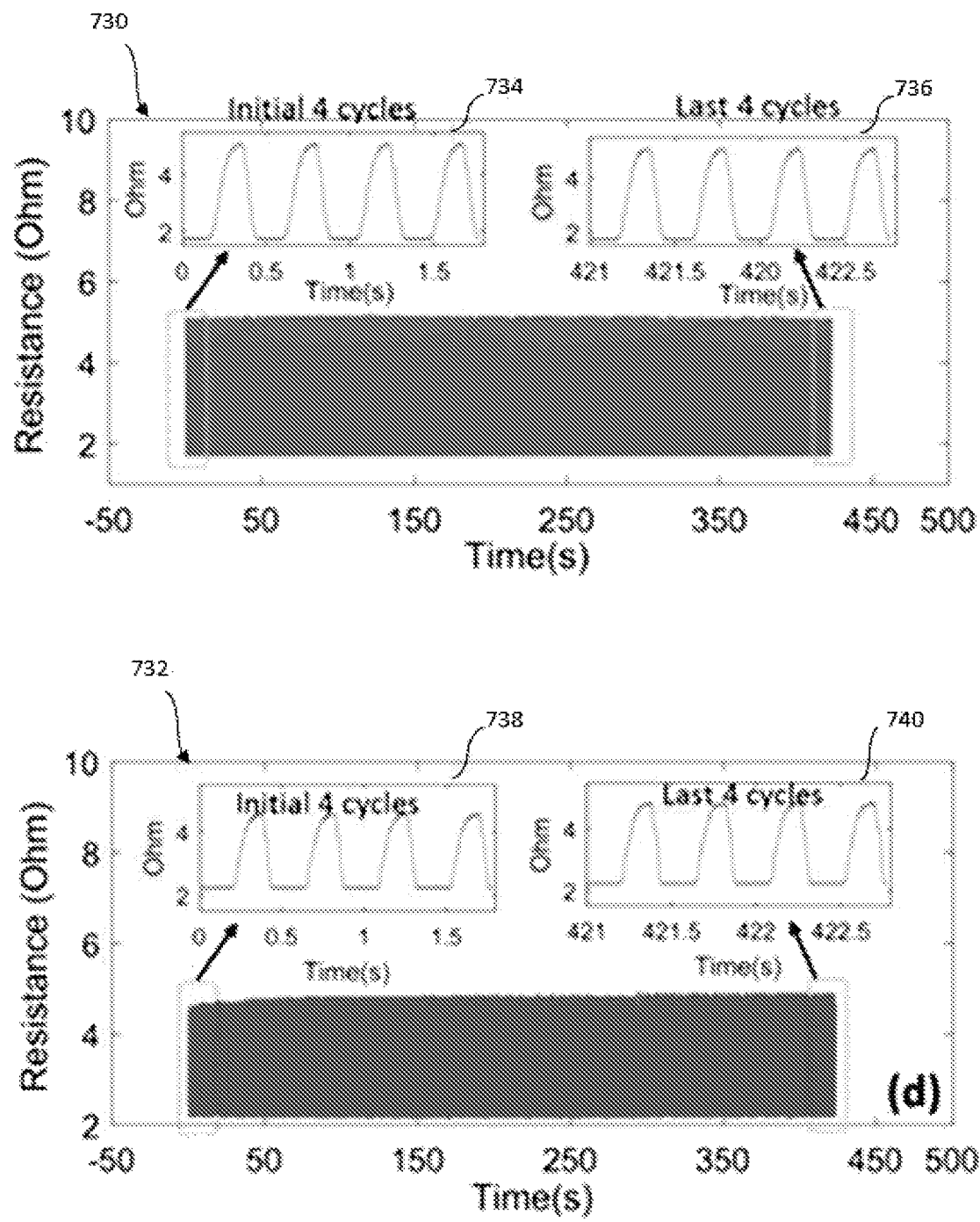
FIG. 7d is a pair of graphs that illustrate the resistance measured over a plurality of cycles of force being applied to the twisted, stretchable, conductive tubules according to embodiments of the present invention.

FIG. 7d illustrates the repeated application of a contact force such as that shown in FIG. 7a for a stretchable, conductive tubule characterized by six turns (shown in graph 730) and eleven turns (shown in graph 732). A contact force is cyclically applied to the stretchable, conductive tubule characterized by ten turns for a period of approximately 450 seconds. The first four cycle and last four cycles of contact force are magnified and shown as inserts 734 and 736, respectively. For example, in graph 730, the first four cycles are shown in insert 734 and last four cycle are shown in insert 736. Likewise, with respect to graph 732, the first four cycles are shown in insert 738 and the last four cycles are shown in insert 740.

The embodiment shown in graph 730 illustrates the stability in measured resistance over time and in response to repeated contact forces applied to the stretchable, conductive tubule having six turns, with the measured resistance remaining virtually unchanged in the first four cycles 734 as in the last four cycles 736. The embodiment shown in graph 732 similarly illustrates the stability in measured resistance over time in response to repeated contact forces, with the resistance measured with respect to the first four cycles (as shown in insert 738) remaining virtually unchanged in the last four cycles (shown in insert 740).

Referring now to FIG. 8a, an embodiment is illustrated in which a stretchable, conductive tubule 800 is connected to a patient's finger 802. Resistance of tubule 800 is measured as the patient's finger is opened (shown in insert 804) and closed (shown in insert 806). In the opened state 804, the strain on the stretchable, conductive tubule 800 is minimized, and as a result the resistance is lower. As the finger is closed, stretchable, conductive tubule 800 is strained/stretched, which results in the measured resistance increasing. In this way, by monitoring the measured resistance, the position of the patient's finger may be determined. In other embodiments, stretchable, conductive tubule may be attached to a robotic finger, in which case the measured resistance may be utilized in feedback to determine the position of the robotic finger.

In addition to illustrating the change of resistance detected in response to movement of the finger between an open position and a closed position, the embodiment shown in FIG. 8a also illustrates the stability in the measured resistance over a period of time. The movement of the finger in this embodiment is less precise, reflected in the measured resistance.

Referring now to FIG. 8b, another embodiment is illustrated in which stretchable, conductive tubule 800 is once again connected to a patient's finger 802. In a first part, between a time of zero seconds and fifteen seconds, the finger is opened (shown in inset 808) and closed (shown in inset 810) to illustrate the change in measured resistance (e.g., between approximately 1.75Ω and 2.0Ω). In a second time period, between fifteen seconds and thirty seconds, the microtubule sensor 800 is repeatedly touched as indicated in inset 812, creating a contact force on the stretchable, conductive tubule. In response to this contact force, the measured resistance increases to anywhere between approximately 2.5Ω to approximately 4.0Ω. In this embodiment, the exact amount of force applied with each touch is erratic, and this is reflected in the measured resistance which varies in response to the amount of force applied.

Referring now to FIG. 8c, a stretchable, conductive tubule 820 is attached to a patient's elbow as indicated in inset 822. The elbow is then extended (see inset 824) and contracted/bent (see inset 826). When in the extended state, the stretchable, conductive tubule 820 is not strained (or strained less), resulting in a decrease in resistance. When the elbow is contracted/bent (826), the stretchable, conductive tubule 820 is strained/stretched, resulting in a measured increase in resistance. As shown in the chart, the measured resistance varies between approximately 2.3Ω and 4.1Ω.

Similarly, FIG. 8d illustrated an embodiment in which a stretchable, conductive tubule 830 is attached to a patient's knee as indicated in inset 832. The knee is then extended (inset 834) and contracted/bent (inset 836). When in the extended state, the stretchable, conductive tubule 830 is not strained (or strained less), resulting in a decrease in resistance. When the elbow is contracted/bent (836), the stretchable, conductive tubule 830 is strained/stretched, resulting in a measured increase in resistance. As shown in the chart, the measured resistance varies between approximately 2.7Ω and 5.0Ω.

Figure 9C:
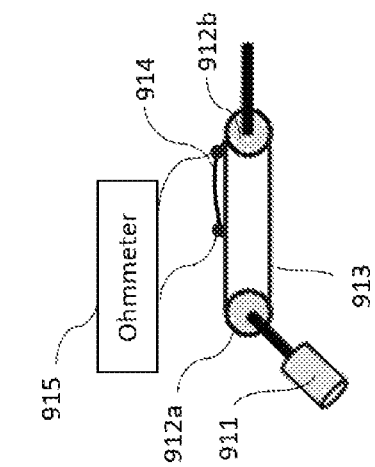
FIGS. 9a-9c illustrate a plurality of various configurations utilized for a tendon-driven robotic system according to embodiments of the present invention.
Figure 9B:
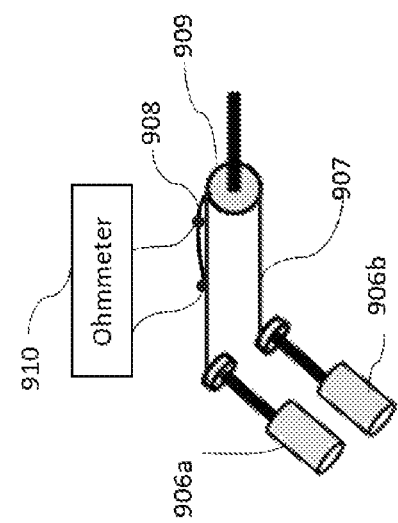
Figure 9A:
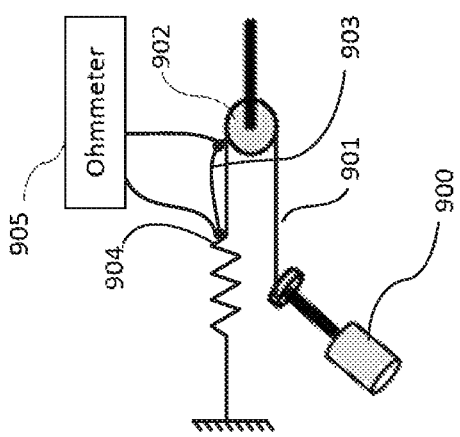
Figure 9D:
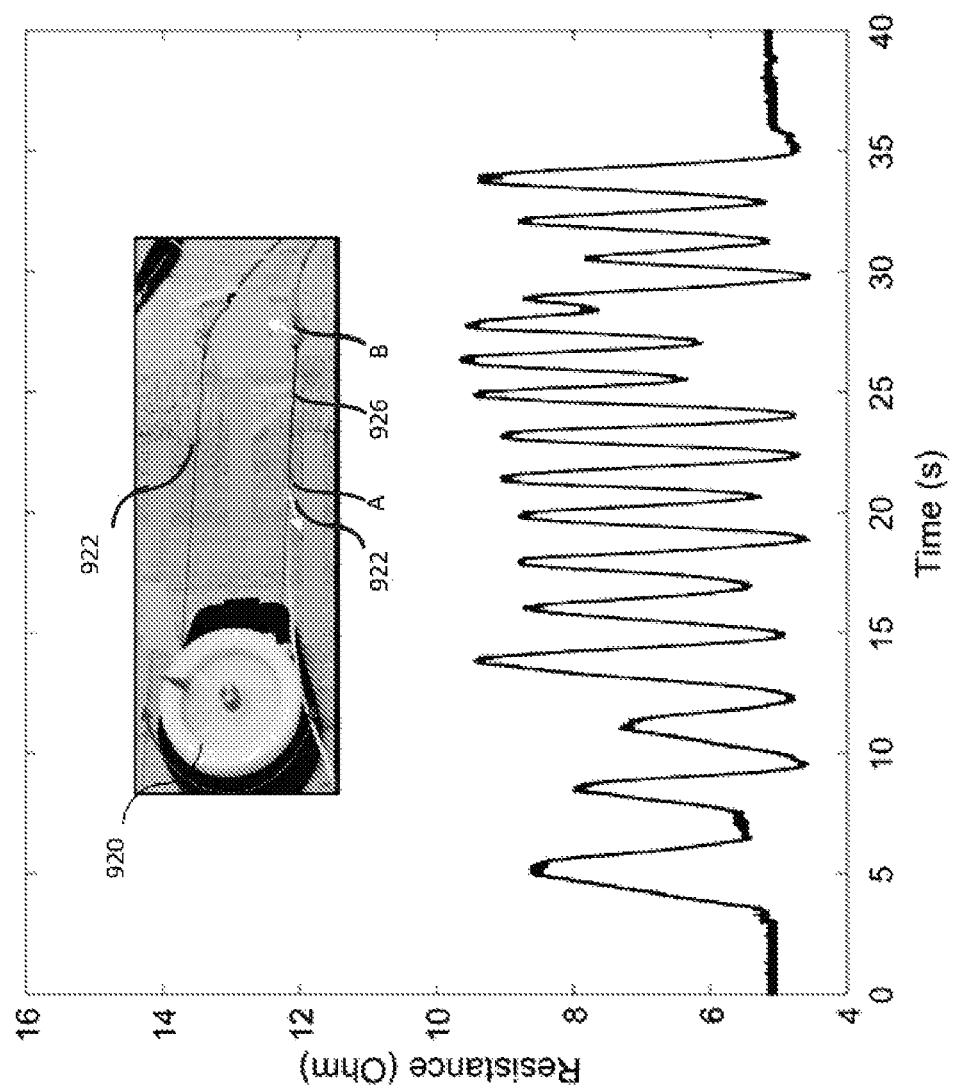
FIG. 9d is a schematic that illustrates the resistance measured in a twisted, stretchable, conductive tubule sensor as a function of displacement in a tendon-driven robotic system.

FIG. 9ba-9c illustrate a plurality of various configurations utilized for a tendon-driven robotic system according to embodiments of the present invention, and FIG. 9d illustrates the resistance measured in a stretchable, conductive tubule as a function of displacement in a tendon-driven robotic system. In tendon-drive robotic systems, an actuator applies force to a tendon, causing the tendon to contrast much like a biomechanical tendon. It is important in these applications to understand the amount of force being applied by the actuator.

For example, in the embodiment shown in FIG. 9a, the tendon-driven robotic system includes an actuator 900, tendon/sheath 901, pulley 902, stretchable, conductive sensor 903, and spring 904. Tendon/sheath 901 includes a tendon located within a sheath. The tendon may be a cable housed within a sheath that is actuated by actuator 900. In this embodiment, actuator 900 is a rotary actuator utilized to selectively contract the tendon/sheath 901, thereby applying a force onto spring 904 via pulley 902. An optical encoder may be utilized to monitor the movement of actuator 900. However, the optical encoder measures only the movement of actuator 900, and does not account for friction, slip, or other inefficiencies associated with the tendon-driven robotic system, and may therefore provide inaccurate feedback resulting the movement/force applied to spring 904 (or other load). In this way, stretchable, conductive sensor 903 can be utilized to provide more accurate feedback regarding the amount of strain/movement applied to spring 904.

In the embodiment shown in FIG. 9a, stretchable, conductive sensor 903 is connected between two points, one of which is fixed (e.g., pulley 902) and another of which is attached to the movable tendon/sheath 901 and/or spring/load 904 to which the tendon/sheath (901) is attached. Ohmmeter 905 is connected to each end of stretchable, conductive sensor 903 in order to measure resistance associated with the stretchable, conductive sensor 903, and in particular changes in measured resistance in response to applied strain. Depending on the application, stretchable, conductive sensor 903 may be installed in a strained state, such that motion in either direction may be detected.

FIG. 9b illustrates another embodiment that includes first and second actuators 900a and 906b, tendon/sheath 907, stretchable, conductive sensor 908, and pulley 909. In this embodiment, tendon/sheath 907 is connected at each end to an actuator 906a and 906b, respectively. Movement/force may be applied by either actuator 906a or actuator 906b. Stretchable, conductive sensor 908 is once again connected to one point that is fixed (e.g., pulley 909) and one point which moves with tendon/sheath 907, such as the tendon/sheath itself. Ohmmeter 910 is connected to first and second ends of stretchable, conductive sensor 908 to monitor the resistance of the stretchable, conductive sensor. Once again, the stretchable, conductive sensor 903 may be installed in a strained state.

FIG. 9c illustrates another embodiment that includes actuator 911 connected to drive puller 912a, which in turn is connected via tendon/sheath 913 to pulley 912b. Stretchable, conductive tubule sensor 914 is once again connected to one point that is fixed (e.g., pulley 912b) and one point which moves with tendon/sheath 913. Ohmmeter 915 is connected to first and second ends of stretchable, conductive sensor 914 to monitor the resistance of the stretchable, conductive sensor, which varies with the strain/movement applied by actuator 911. In other embodiments, other configurations may be utilized. In particular, the stretchable, conductive sensor exhibits changes in resistance related to the actuation applied to the tendon/sheath. The changes in resistance are utilized to determine the amount of movement/strain applied to the tendon/sheath. In this way, the stretchable, conductive tubule in this embodiment is utilized to provide feedback regarding the position/strain applied by the respective actuator or actuators.

FIG. 9d is a graph that illustrates the change in resistance measured in response to force applied to a tendon. The inset shown in FIG. 9d illustrates a tendon-driven robotic system according to an embodiment of the present invention. The tendon-drive robotic system includes pulley 920, tendon/sheath 922, and twisted, stretchable, conductive tubule 926. Tendon 922 is wrapped around the rotatable pulley 920, allowing tendon to be actuated/moved in response to application of a strain force applied by, for example, an actuator (not shown). Stretchable, conductive tubule/sensor 926 is connected between points A and B, wherein point B is a fixed location and point A is connected to tendon/sheath 922 and moves therewith. The amount of strain or force applied to the tendon can be determined by monitoring the change in resistance of stretchable, conductive tubule/sensor 926 via an ohmmeter (not shown).

The graph shown in FIG. 9d illustrates the change in resistance measured over a period of time, in which force is applied to the tendon. As shown in FIG. 9d, the resistance increases in response to actuating of the tendon, as a result of strain applied to the stretchable, conductive tubule. In one embodiment, the measured resistance is utilized in feedback to determine the force applied by the actuator to the tendon, and/or the amount of movement detected with respect to the tendon.

Figure 10A:
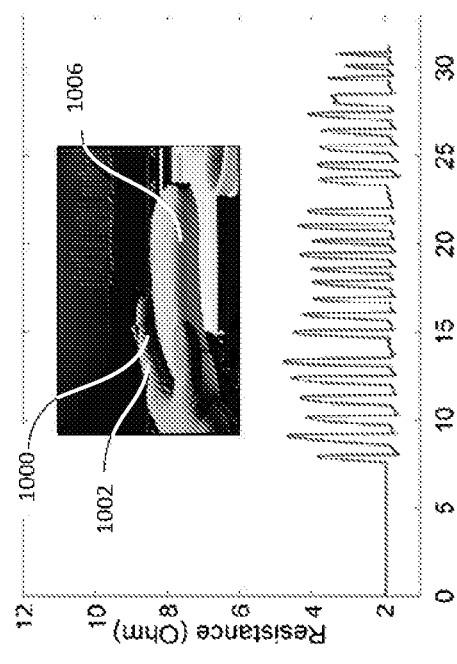
FIGS. 10a-10d are graphs that illustrate the resistance measured as a function of picking up various objects using a twisted, stretchable, conductive tubule sensor according to embodiments of the present invention.
Figure 10B:
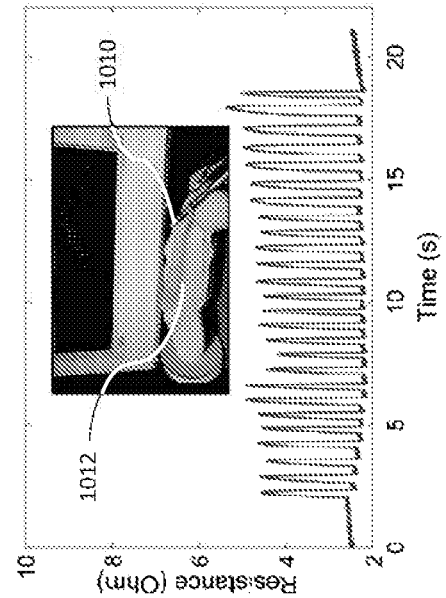
Figure 10C:
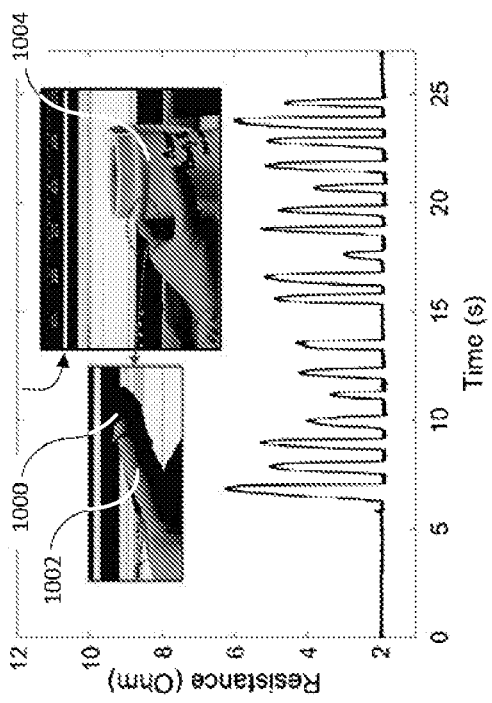
Figure 10D:
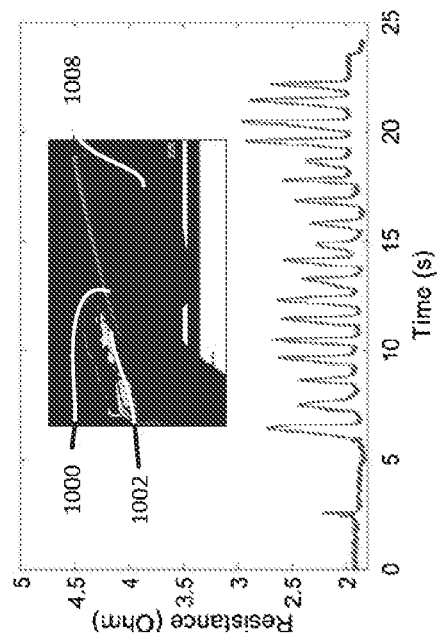

FIGS. 10a-10d are graphs that illustrate the resistance measured as a function of picking up various objects using a stretchable, conductive tubule 1000 according to embodiments of the present invention. In FIGS. 10a-10c, a stretchable, conductive tubule 1000 is mounted to a user's finger 1002 and resistance is measured while the user picks up various objects, including a coffee cup 1004 (shown in FIG. 10a), a banana 1006 (shown in FIG. 10b), and a piece of soft foam 1008 (shown in FIG. 10c). FIG. 10d illustrates a stretchable, conductive tubule mounted to a surgical device 1010, wherein the resistance measured varies in response to the surgical tool coming into contact with a virtual stomach 1012.

In the embodiment shown in FIG. 10a, the measured resistance varies between approximately 2Ω and 6Ω as the stretchable, conductive sensor 1000 contacts the surface of the coffee cup 1004. Because the surface of the coffee cup 1004 is relatively hard as compared with the banana 1006 and soft foam 1008 shown in FIGS. 10b and 10c, the change in resistance measured is relatively large (e.g., approximately 4Ω). In FIG. 10b, in response to the stretchable, conductive sensor 1000 being brought into contact/picking up the banana 1006, the measured resistance varies between approximately 2Ω and 5Ω. Similarly, in response to the stretchable, conductive sensor 1000 contacting/picking up a piece of soft foam 1008 as shown in FIG. 10c, the measured resistance varies between approximately 2Ω and 3Ω. In this way, FIGS. 10a-10c illustrate that not only can the measured resistance be utilized to detect whether an object is being grasped by a user, but may also be utilized to detect the amount of force exerted by the user to pick up the object, which in turn provides details regarding the object being picked up or contacted (e.g., hardness, weight, etc.).

FIG. 10d illustrates that the same principles can be utilized with respect to an instrument such as a surgical instrument 1010. A benefit of utilizing a surgical instrument equipped with a stretchable, conductive tubule sensor, is the ability to determine more precisely the amount of force being exerted by the tool onto the patient. This may be particularly important in applications in which surgery is performed by a robotic surgeon, which requires feedback regarding the amount of force being applied. In the embodiment shown in FIG. 10d, the surgical tool 1010 equipped with a stretchable, conductive tubule is brought into contact with an artificial stomach 1012, wherein the measured resistance varies between approximately 2Ω and 5.5Ω.

Figure 11A:
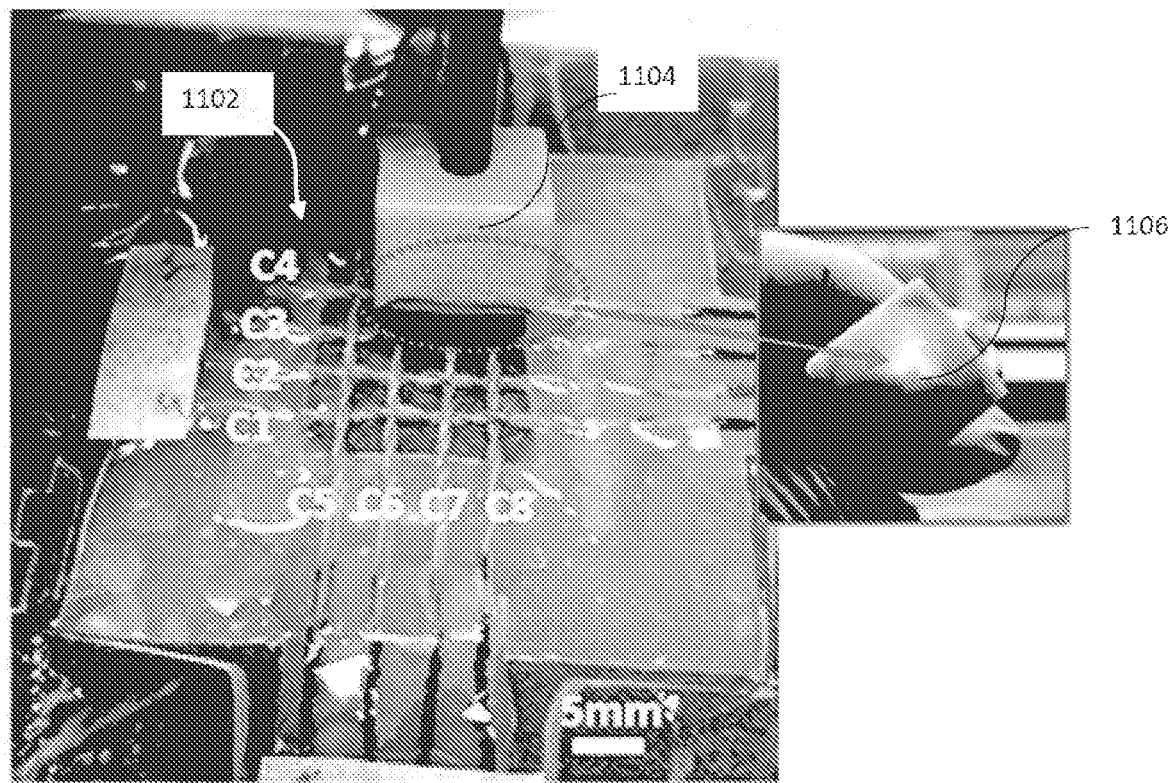
FIG. 11a is a perspective view of a twisted, stretchable, conductive tubule sensor array to which force is applied
Figure 11B:
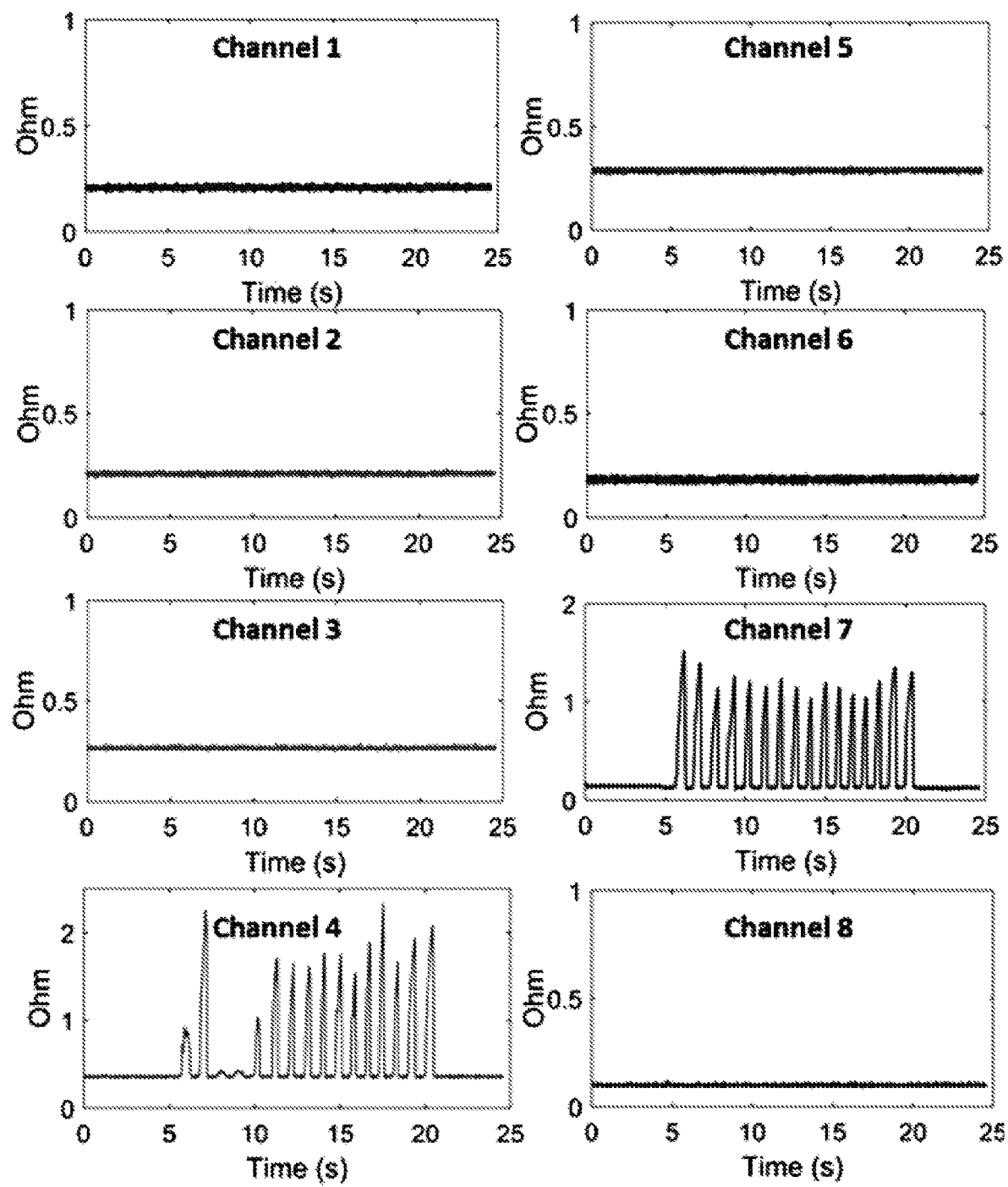
FIG. 11b is a plurality of graphs—each corresponding to a different twisted, stretchable, conductive tubule channel—that illustrate resistance measured in response to the applied force.

FIG. 11a is a perspective view of a stretchable, conductive tubule array 1102 to which force is applied, and FIG. 11b illustrates a plurality of graphs—each corresponding to a different twisted microtubule channel—that indicate the resistance measured in response to the applied force, according to embodiments of the present invention.

The stretchable, conductive tubule array 1100 shown in FIG. 11a includes four horizontally oriented stretchable, conductive tubule sensors (labeled channels C1, C2, C3, C4), and four vertically oriented stretchable, conductive tubule sensors (labeled channels C5, C6, C7, and C8). Resistance is monitored for each of the plurality of tubules. The measured resistance is illustrated in FIG. 11b, which illustrates eight individual channels. A change in resistance is measured in response to the force applied to the array by press 1104, with the change in resistance being localized to those microtubule sensors that are contacted. The use of an array of microtubule sensors 1102 allows the location of the force to be detected within the array based on which channel(s) exhibit a change in resistance. For example, in the embodiment shown in FIG. 11a, force is applied (as a contact force) onto stretchable, conductive tubules corresponding with channels C4 in the horizontal direction and C7 in the vertical direction. This is indicated by the changes in resistance illustrated with respect to channels C4 and C7 shown in FIG. 11b.

Figure 12A:
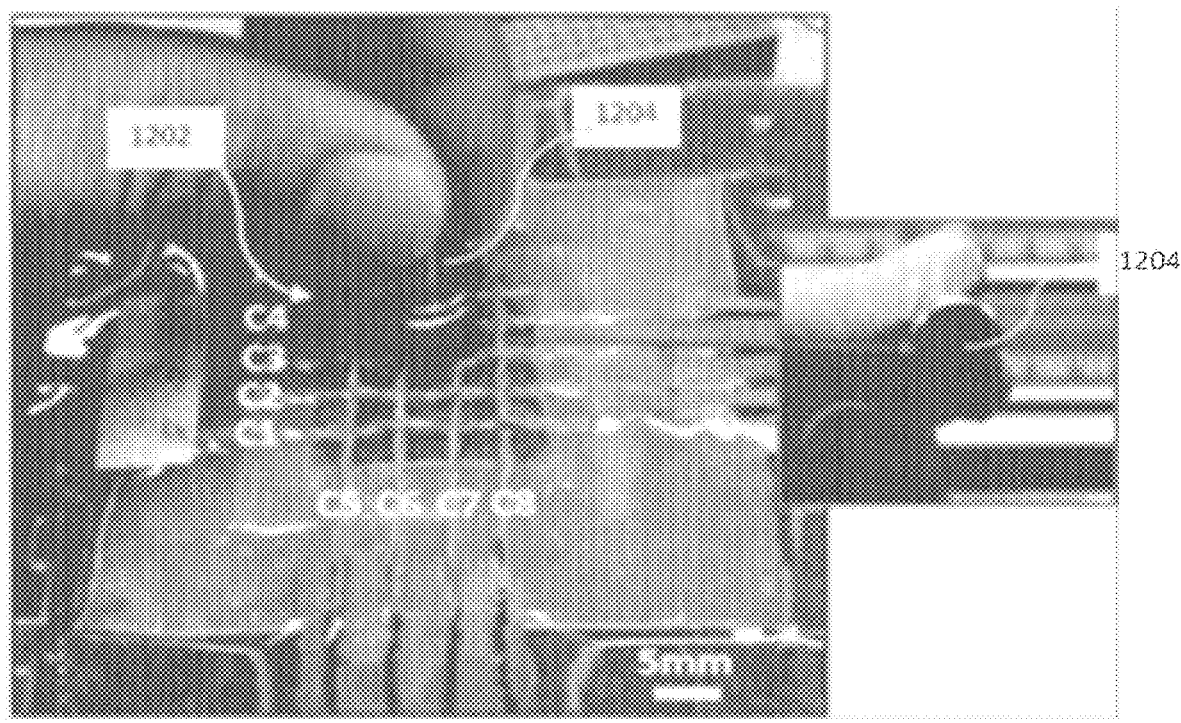
FIG. 12a is a perspective view of a twisted, stretchable, conductive tubule sensor array to which force is applied.
Figure 12B:
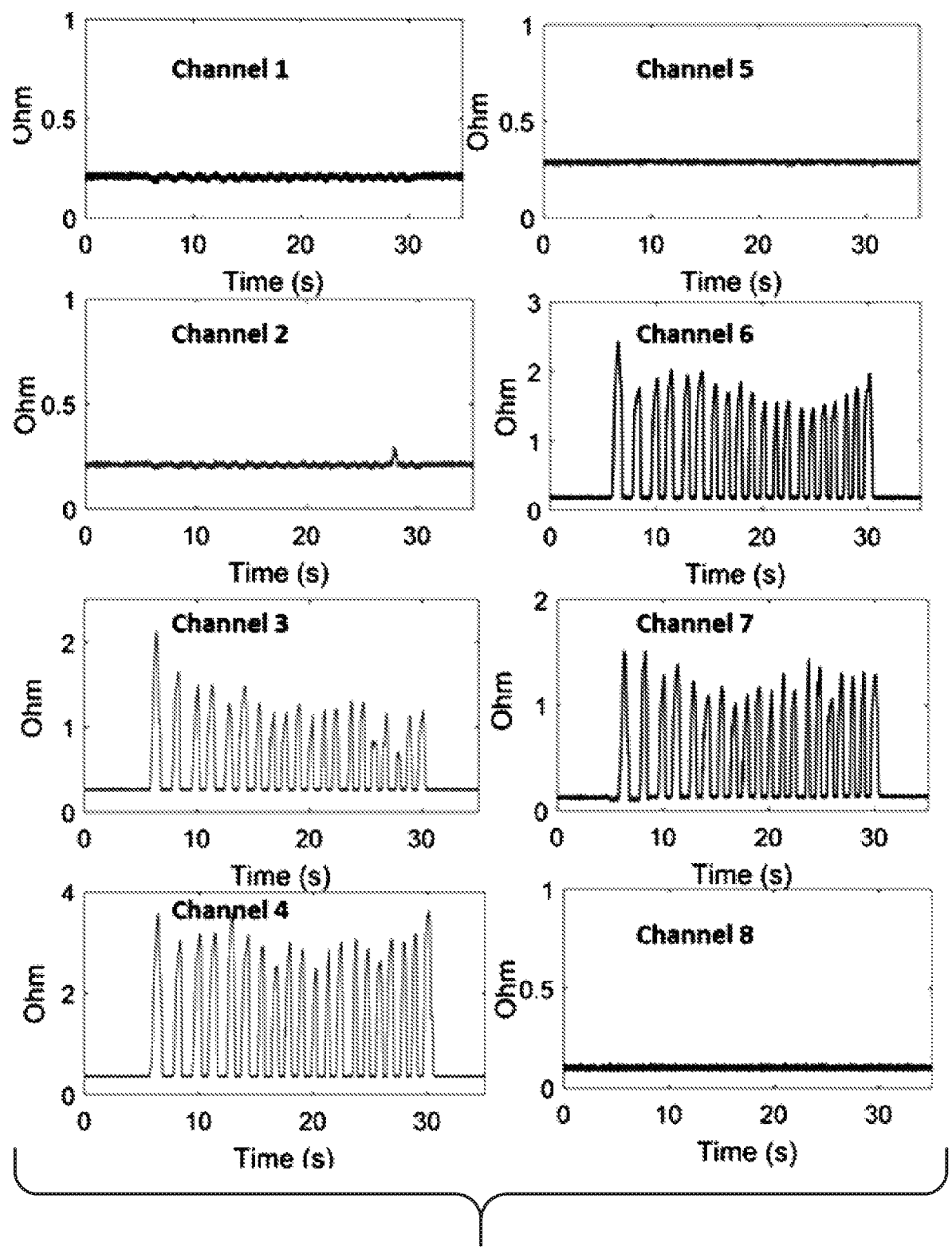
FIG. 12b is a plurality of graphs—each corresponding to a different twisted, stretchable, conductive tubule channel—that illustrate resistance measured in response to the applied force.

Similarly, FIG. 12a is a perspective view of a stretchable, conductive tubule array 1202 to which force is applied, and FIG. 12b illustrates a plurality of graphs—each corresponding to a different stretchable, conductive tubule—that indicate the resistance measured in response to the applied force, according to embodiments of the present invention. In contrast with the embodiment shown in FIGS. 12a and 12b, a larger point of contact is illustrated in FIGS. 12a and 12b (i.e., a larger surface area device 1204). As a result, contact with the array results in a contact force being applied to a plurality of microtubule sensors.

In particular, in the embodiment shown in FIG. 12a, the contact force applied to the array 1202 makes contact with horizontal stretchable, conductive tubules C3 and C4, and vertical stretchable, conductive tubules C6 and C7. In response to the applied contact force, a change in resistance is measured in channels C3 and C4, as well as channels C6 and C7. The graphs shown in FIG. 12b reflect the applied contact force, with channels C3, C4, C6 and C7 all indicating changes in resistance.

Figure 13:
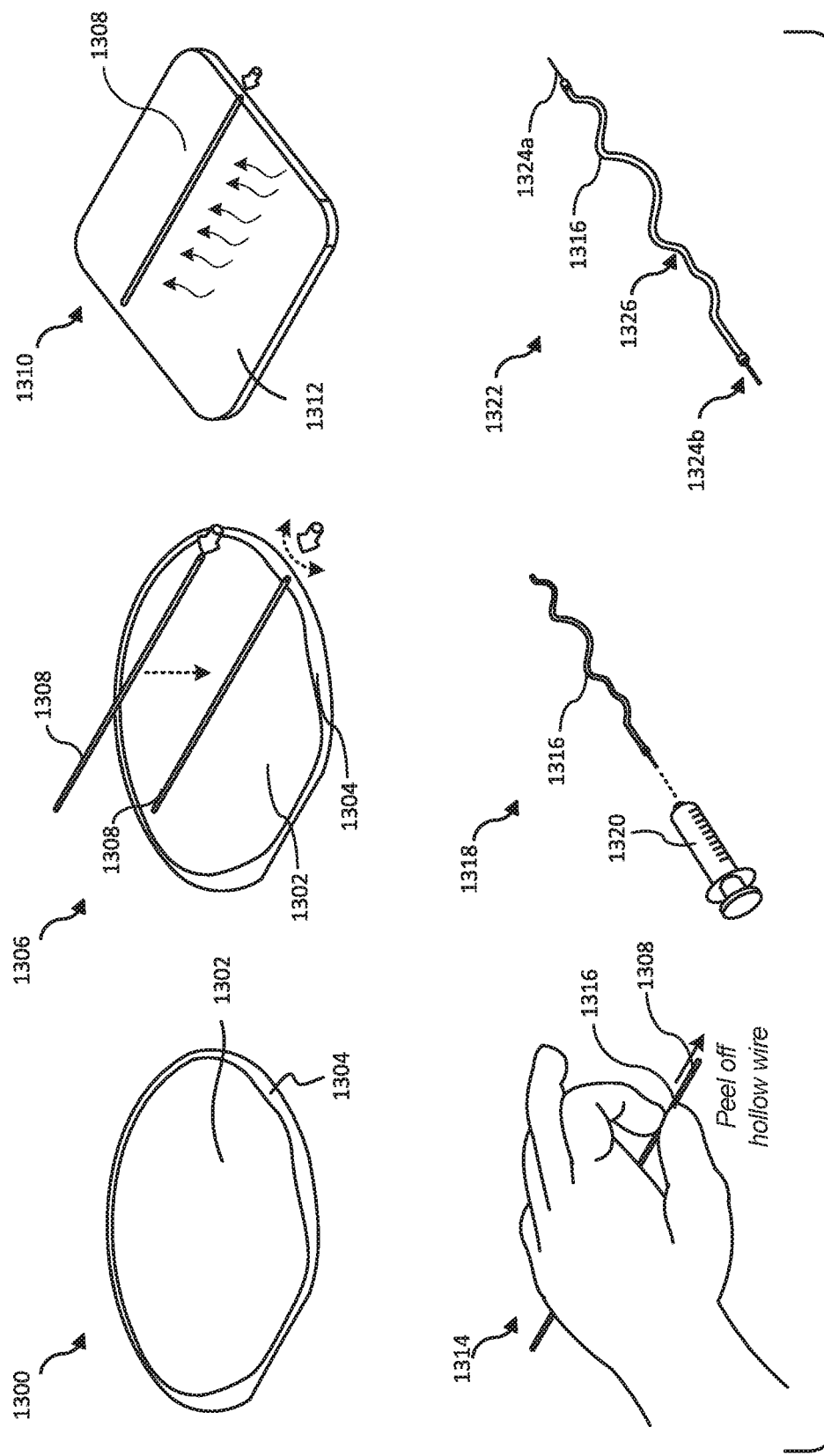
FIG. 13 is a flowchart that illustrates a process for fabricating a microtubule sensor according to an embodiment of the present invention.

FIG. 13 illustrates a process for fabricating a microtubule sensor according to an embodiment of the present invention. At step 1300, a liquid material 1302 to be utilized for the hollow tube is spread across a flat surface 1304. In the embodiment shown in FIG. 13, the material 1302 is a liquid elastomer and the flat surface 1304 is a silicon wafer.

At step 1306, a rod 1308 is rolled across the liquid material 1302 to accumulate a layer of the liquid material 1302 on the surface of the rod 1308. In effect, by rolling the rod 1308 across the flat surface 1304, the entire surface of the rod 1308 is coated with the liquid material 1302. In one embodiment, the rod 1308 is a carbon fiber rod. In other embodiments, other materials may be utilized that allow for the subsequent separation/peeling of the cured/solidified liquid material from the rod.

At step 1310, the rod 1308 is place on a heated surface 1312 in order to cure/solidify the liquid material 1302 coating the surface of the rod 1308. This results in the formation of hollow tube (shown in step 1314) comprised of a cured/solidified material. The benefit of using an elastomer-type material, is that it is stretchable when cured. The thickness of the walls defining the hollow tube can be controlled by repeating steps 1306 and 1310 a number of times until the desired thickness of the walls is achieved.

At step 1314, the hollow tube 1316 is peeled/removed from the rod 1308. The thickness of the hollow tube 1316 depends on the number of times steps 1306 and 1310 were repeated.

At step 1318, the ends of hollow tube 1316 are capped and a stretchable conductor 1320 is inserted (e.g., injected using a syringe 1320 in the embodiment shown) into the hollow tube 1316. As described above, the stretchable conductor may be any type of stretchable conductor, such as the stretchable conductor allow conductor eutectic gallium indium (eGaIn).

At step 1322, electrodes 1324a and 1324b are attached to each end of the hollow tube 1316 to form the stretchable, conductive tubule 1326. Electrodes 1324 form a conductive path between the inserted stretchable conductor 1320 and electrodes 1324.

Although not shown in FIG. 13, stretchable, conductive tubule 1326 is folded over on itself such that electrodes 1324a and 1324b are located approximately alongside one another. Stretchable, conductive tubule 1326 is then twisted/turned a desired number of times depending on the application. In some embodiments, in addition to twisting/turning the microtubule sensor 1326 a predetermined number of times, the microtubule is strained (e.g., 100% strain) prior to twisting the sensor. The resistance and resistive response to force is a function of both the number of twists/turns of stretchable, conductive tubule 1326 and the strain applied to the stretchable, conductive tubule 1326. Therefore, the applied strain and number of turns is precisely controlled during the fabrication process to ensure measured resistance change corresponds with the applied force.

The present disclosure describes a stretchable, conductive tubule interconnect. The interconnect comprises a stretchable, hollow tube comprising a stretchable conductor (e.g., stretchable conductor). The stretchable, conductive interconnect can be utilized in applications that require a conductive path to be capable of stretching while maintaining electrical conductivity. In addition, the stretchable, conductive tubule exhibits changes in resistance in response to applied force. By twisting the stretchable, conductive tubule, the resistive sensitivity of the tubule can be increased. Based on these observations, the twisted, stretchable, conductive tubule can be utilized as a sensor to detect forces applied to the tubule, including strain, contact, and rotational forces as well as combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A stretchable, conductive interconnect comprising:
   a stretchable tubule having a first end and a second end;
   a stretchable conductor housed within the stretchable tubule;
   a first electrode, electrically coupled to the stretchable conductor at the first end of the stretchable tubule;
   a second electrode, electrically coupled to the stretchable conductor at the second end of the stretchable tubule;
   wherein the stretchable, conductive interconnect is twisted to form a twisted, stretchable, conductive interconnect.

2. The stretchable, conductive interconnect of claim 1, wherein the stretchable tubule is comprised of a stretchable polymer material.

3. The stretchable, conductive interconnect of claim 2, wherein the stretchable polymer material is silicone.

4. The stretchable, conductive interconnect of claim 1, wherein the stretchable conductor consists of one or more of a stretchable conductor alloy, such as eutectic gallium indium (eGaIn), a doped elastomer, and a conductive gel.

5. The stretchable, conductive interconnect of claim 1, wherein resistance of the stretchable, conductive interconnect increases in response to one or more of linear strain, contact force, and rotation applied to the stretchable, conductive interconnect.

6. The stretchable, conductive interconnect of claim 1, wherein a sensitivity of the stretchable, conductive interconnect depends, at least in part, on the numbers of times the stretchable, conductive interconnect is turned/twisted.

7. The stretchable, conductive interconnect of claim 6, wherein the sensitivity is defined as the change in resistance measured in response to applied strain.

8. The stretchable, conductive interconnect of claim 1, further including:
- an ohmmeter connected to the first electrode and the second electrode to measure resistance of the stretchable, conductive interconnect, wherein force applied to the twisted, stretchable, conductive interconnect is detected based on the measured resistance.

9. The stretchable, conductive interconnect of claim 1, wherein resistance of the stretchable, conductive interconnect increases in response to a linear strain applied to the interconnect.

10. The stretchable, conductive interconnect of claim 1, wherein resistance of the stretchable, conductive interconnect increases in response to a contact force applied to the interconnect.

11. The stretchable, conductive interconnect of claim 1, wherein resistance of the stretchable, conductive interconnect increases in response to a rotation applied to the interconnect that increases the number of turns of the stretchable, conductive interconnect.

12. A method of manufacturing a stretchable, conductive interconnect, the method comprising:
- depositing a liquid layer onto a surface;
- rotating a rod across the surface to uniformly coat the rod with the liquid layer;
- heating the rod to cure the liquid layer uniformly coating the rod to form a stretchable tube around the rod;
- removing the stretchable tube from the rod;
- inserting a conductor into the stretchable tube; and
- placing a cap onto first and second ends of the stretchable tube and first and second electrodes in contact with the conductor, to form a stretchable, conductive interconnect.

13. The method of claim 12, wherein the stretchable, conductive interconnect is twisted to form a twisted, stretchable, conductive tubule.

14. The method of claim 12, wherein an ohmmeter is connected to the first and second electrodes to measure resistance of the path extending from the first electrode, the conductor, to the second electrode.

15. A sensor comprising:
- a stretchable tubule having a first end and a second end;
- a stretchable conductor housed within the stretchable tubule;
- a first electrode, electrically coupled to the stretchable conductor at the first end of the stretchable tubule; and
- a second electrode, electrically coupled to the stretchable conductor at the second end of the stretchable tubule, wherein the stretchable tubule is twisted a number of times to form a twisted, stretchable, conductive tubule.

16. The sensor of claim 15, further comprising:
- an ohmmeter connected to the first and second electrodes to measure resistance of the twisted, stretchable, conductive tubule, wherein resistance varies m response to force applied to the twisted, stretchable, conductive tubule.

17. The sensor of claim 15, wherein resistance of the sensor increases in response to a linear strain applied to the sensor.

18. The sensor of claim 15, wherein resistance of the sensor increases in response to a contact force applied to the sensor.

19. The sensor of claim 15, wherein resistance of the sensor increases in response to a rotation applied to the sensor that increases the number of turns of the sensor.

* * * * *